United States Patent
Bouyssou et al.

(10) Patent No.: US 12,168,955 B2
(45) Date of Patent: Dec. 17, 2024

(54) CONSTANT-VOLUME COMBUSTION SYSTEM WITH SYNCHRONIZED INJECTION

(71) Applicants: SAFRAN, Paris (FR); SAFRAN HELICOPTER ENGINES, Bordes (FR)

(72) Inventors: Quentin Bouyssou, Moissy-Cramayel (FR); Guillaume Alain Taliercio, Moissy-Cramayel (FR); Christophe Nicolas Henri Viguier, Moissy-Cramayel (FR); Daniel Mejia, Moissy-Cramayel (FR)

(73) Assignees: SAFRAN, Paris (FR); SAFRAN.HELICOPTER ENGINES, Bordes (FR)

( * ) Notice: Subject to any disclaimer, the term of this patent is extended or adjusted under 35 U.S.C. 154(b) by 25 days.

(21) Appl. No.: 17/596,864

(22) PCT Filed: Jun. 11, 2020

(86) PCT No.: PCT/FR2020/050994
§ 371 (c)(1),
(2) Date: Dec. 20, 2021

(87) PCT Pub. No.: WO2020/254743
PCT Pub. Date: Dec. 24, 2020

(65) Prior Publication Data
US 2022/0316393 A1    Oct. 6, 2022

(30) Foreign Application Priority Data
Jun. 21, 2019    (FR) ...................................... 1906729

(51) Int. Cl.
F02C 5/12    (2006.01)

(52) U.S. Cl.
CPC .......... *F02C 5/12* (2013.01); *F05D 2220/323* (2013.01); *F05D 2240/35* (2013.01)

(58) Field of Classification Search
CPC ..................................... F02C 5/04; F02C 5/12
See application file for complete search history.

(56) References Cited

U.S. PATENT DOCUMENTS 1,025,117 A * 5/1912 Boyer ....................... F02C 5/04
                                                        60/39.44
1,298,430 A * 3/1919 Wondra .................... F02C 5/12
                                                         60/39.4

(Continued)

FOREIGN PATENT DOCUMENTS

WO    2016120551 A1    8/2016
WO    2018234698 A1    12/2018

OTHER PUBLICATIONS https://web.archive.org/web/20150320175433/https://www.performancetrends.com/Definitions/Rocker-Arms.htm (Year: 2015).*

(Continued)

*Primary Examiner* — Ted Kim
(74) *Attorney, Agent, or Firm* — Bookoff McAndrews, PLLC

(57) ABSTRACT

A constant volume combustion system for a turbomachine comprises a plurality of combustion chambers distributed annularly about an axis, each combustion chamber comprising an inlet orifice and an outlet orifice, a selective shut-off element movable in rotation relative to the combustion chambers, the selective shut-off element comprising a shroud facing the inlet and outlet orifices of the combustion chambers. The shroud including on a first annular portion at least one intake aperture intended to cooperate with the inlet orifice of each combustion chamber during the rotation of the selective shut-off element and on a second annular portion at least one exhaust aperture intended to cooperate (Continued)

with the outlet orifice of each combustion chamber during the rotation of the selective shut-off element. Each combustion chamber comprises a fuel injection device whose opening and closing are synchronized by the shut-off element.

6 Claims, 4 Drawing Sheets

(56) References Cited

U.S. PATENT DOCUMENTS

| | | | | |
|---|---|---|---|---|
| 1,299,330 | A | * | 4/1919 | Groves ..................... F02K 7/02 |
| | | | | 60/39.38 |
| 1,339,730 | A | * | 5/1920 | Williams ................... F02C 5/02 |
| | | | | 60/39.44 |
| 1,616,646 | A | * | 2/1927 | Lucien ...................... F02C 5/02 |
| | | | | 60/39.38 |
| 3,199,496 | A | * | 8/1965 | Kell ......................... F02B 53/00 |
| | | | | 123/205 |
| 3,650,105 | A | * | 3/1972 | Toye ......................... F02C 5/02 |
| | | | | 60/39.38 |
| 4,288,981 | A | | 9/1981 | Wright |
| 4,306,528 | A | * | 12/1981 | Straubel ............... F02M 57/024 |
| | | | | 123/357 |
| 6,021,746 | A | * | 2/2000 | Pyon ......................... F02C 5/02 |
| | | | | 123/18 A |
| 6,026,786 | A | * | 2/2000 | Groff .................... F02M 57/023 |
| | | | | 123/508 |
| 2007/0157625 | A1 | * | 7/2007 | Snyder ..................... F23R 7/00 |
| | | | | 60/39.38 |
| 2021/0156302 | A1 | * | 5/2021 | Leyko ...................... F02C 5/12 |

OTHER PUBLICATIONS

French Search Report issued in French Application FR1906729 on Feb. 17, 2020 (2 pages).

International Search Report issued in International Application PCT/FR2020/050994 on Sep. 28, 2020 with English Translation (4 pages).

Written Opinion of the International Searching Authority issued in International Application PCT/FR2020/050994 (6 pages).

* cited by examiner

CONSTANT-VOLUME COMBUSTION SYSTEM WITH SYNCHRONIZED INJECTION

CROSS-REFERENCE TO RELATED APPLICATION(S)

This patent application is the U.S. National Stage entry under 35 U.S.C. § 371 of International Patent Application No. PCT/FR2020/050994, filed on Jun. 11, 2020, which claims the benefit of priority to French Patent Application No. 1906729, filed on Jun. 21, 2019.

TECHNICAL FIELD

The present invention relates to the field of combustion chambers for aircraft turbomachines, of the constant volume combustion type. The invention applies to all types of turbomachines, particularly to turbojet engines, turboprops and unducted fan turbomachines, also known as "Open Rotor".

PRIOR ART

A conventional aircraft turbomachine includes, in a known manner, one or several combustion chambers. Such a combustion chamber is supplied with pressurized air by a compressor module and it includes one or several fuel injectors which are able to inject fuel into the admitted air stream in order to burn it and thus cause the emission of hot gases which are used to drive a turbine, which in turn drives the compressor module and which can also drive a fan of the turbomachine.

In such a chamber, the fuel flow rate is continuous and the combustion operates according to a cycle called Brayton cycle that is to say according to a combustion cycle at constant pressure. Nevertheless, in order to obtain specific consumption savings, it has been envisaged to replace the combustion chamber operating according to a Brayton cycle by a plurality of combustion chambers operating according to a Humphrey cycle that is to say according to a constant volume combustion or "CVC" cycle. Document WO 2016/120551 discloses a constant volume combustion module including combustion chambers arranged about an axis, each chamber comprising an inlet orifice or intake port for compressed gases and an outlet orifice or exhaust port for flue gases, and an intake/exhaust rotary valve. Each inlet/outlet orifice is configured to be opened or closed by the intake/exhaust rotary valve.

In this type of combustion module, the management of transfer and injection times determines the quality of the combustion process. The combustion efficiency has a direct impact on the efficiency of the overall system. However, piloting the fuel injection in constant volume combustion systems is difficult and complex to implement. Consequently, there is a need to optimize the management of fuel injection times and the synchronization with the other elements (inlet/outlet orifices) in this type of system and to simplify its implementation.

DISCLOSURE OF THE INVENTION

To this end, the present invention proposes a constant volume combustion system for a turbomachine comprising a plurality of combustion chambers distributed annularly about an axis, each combustion chamber comprising an inlet orifice or intake port and an outlet orifice or exhaust port, a selective shut-off element movable in rotation about the axis relative to the combustion chambers, the selective shut-off element comprising a shroud facing the inlet and outlet orifices of the combustion chambers, the shroud including on a first annular portion at least one intake aperture intended to cooperate with the inlet orifice of each combustion chamber during the rotation of the selective shut-off element and on a second annular portion at least one exhaust aperture intended to cooperate with the outlet orifice of each combustion chamber during the rotation of the selective shut-off element, characterized in that each combustion chamber comprises a fuel injection device whose opening and closing are synchronized by the shut-off element.

The use of the same mechanical part, namely the shut-off element, to ensure both the function of sequencing the air openings and closings and of supplying fuel ensures efficient synchronization between the critical times in the combustion system. The management of the injection times is optimized with respect to the combustion and exhaust times or phases, thus improving the efficiency of the combustion system.

According to a particular characteristic of the system of the invention, the fuel injection device comprises an injection valve present between a fuel supply circuit and a combustion chamber and a rocker arm configured to control the opening of the injection valve, the rocker arm cooperating with one or several injection cams present on the shut-off element to control the opening of the injection valve. This injection is carried out directly into the combustion chamber. Through its design, the injection cam allows both pressurizing the injected fuel and controlling the injected amount.

According to another particular characteristic of the system according to the invention, the latter further comprises an aerodynamic injection device configured to supply fuel to each combustion chamber in a synchronized manner via one or several injection orifices present on the shut-off element. This allows performing a function of carburizing the combustion chambers with small fuel drop sizes without having to implement high levels of fuel pressure. It is thus possible to obtain consumption savings compared to an injection only at high pressure.

The invention also relates to a turbomachine comprising an axial or centrifugal compressor and an axial or centripetal turbine, the turbomachine further comprising a combustion system according to the invention, the combustion system being present between the compressor and the turbine.

A further object of the invention is an aircraft comprising at least one turboprop, the turboprop comprising a turbomachine according to the invention.

DESCRIPTION OF THE EMBODIMENTS

The invention applies generally to a turbomachine comprising an axial or centrifugal compressor and an axial or centripetal turbine.

Figure 1:
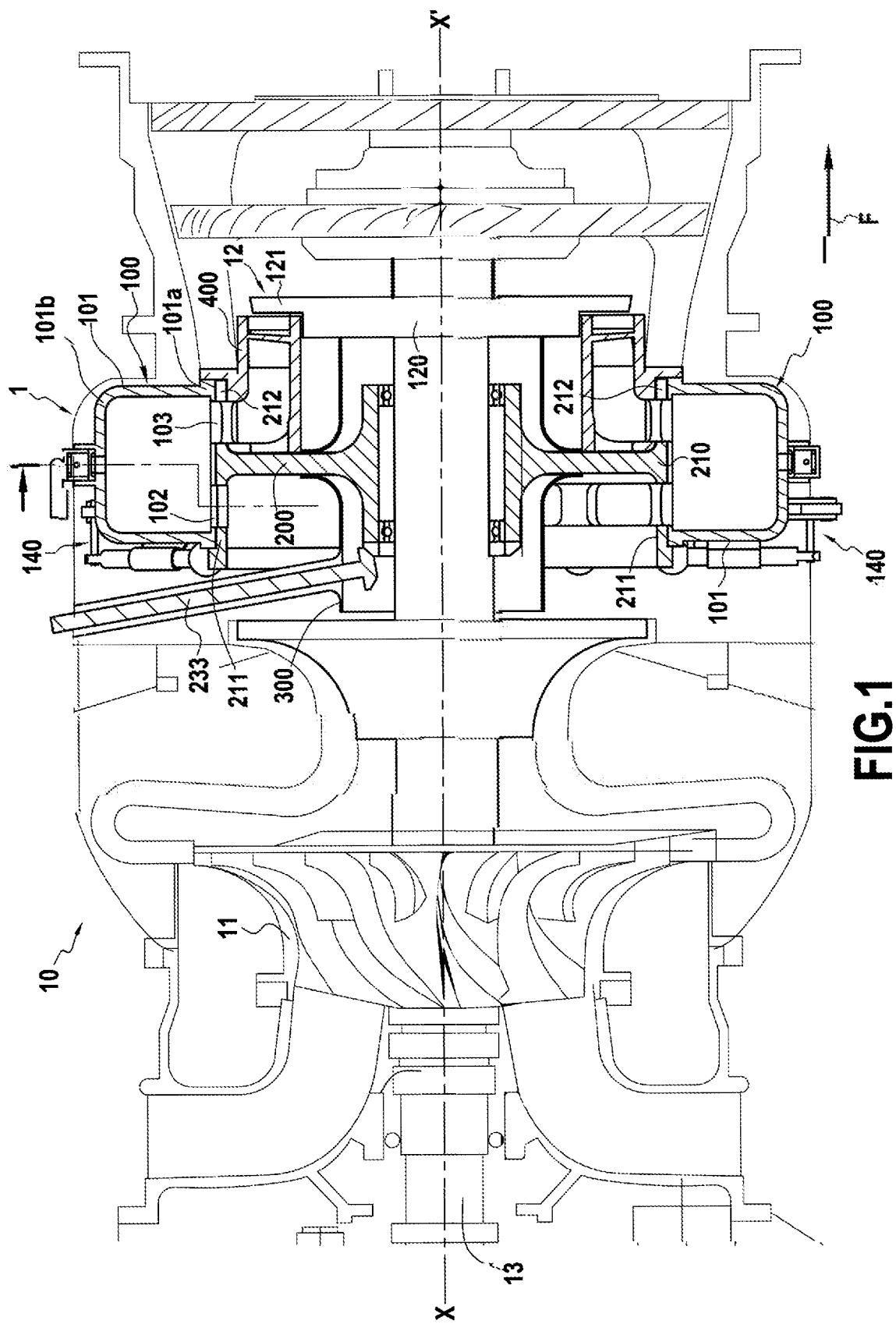
FIG. 1 is a schematic longitudinal sectional view of a turbomachine comprising a combustion system in accordance with one embodiment of the invention.
Figure 2A:
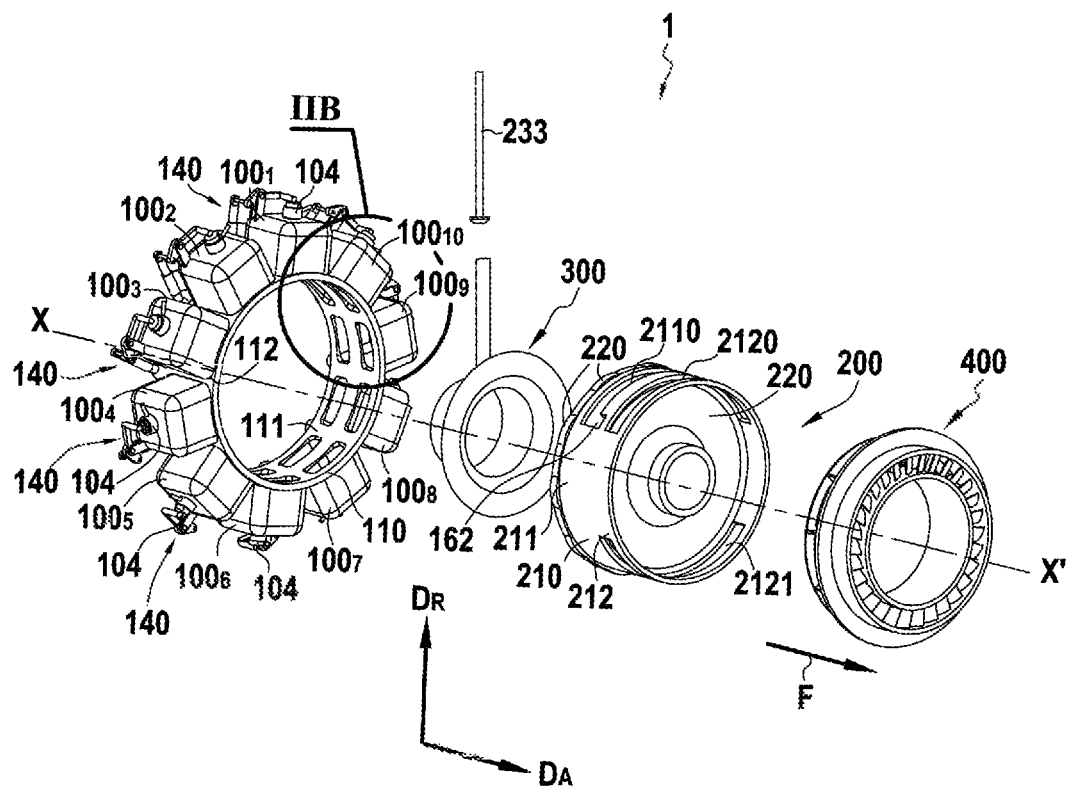
FIG. 2A is a schematic exploded perspective view of the combustion system of FIG. 1.
Figure 2B:
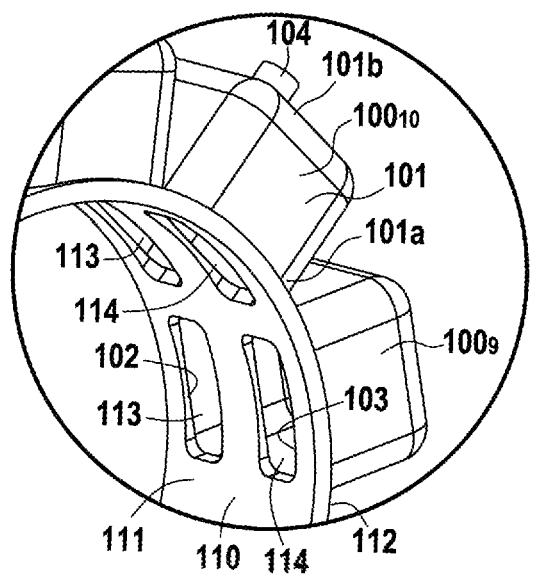
FIG. 2B is a detail view of FIG. 2A showing the combustion chambers.

FIGS. 1, 2A and 2B illustrate a combustion system 1 in accordance with one embodiment of the invention. In the example described here and as represented in FIG. 1, the combustion system 1 is integrated into a turbomachine or turbine engine 10 for a turboprop, the combustion system being placed in the turbine engine downstream of an axial-centrifugal compressor 11 and upstream of an axial turbine 12, the compressor 11 and the turbine 12 being interconnected by a shaft system 13. The turbine 12 comprises a movable wheel 120 connected at its center to the shaft system 13 and including at its outer radial end a plurality of blades 121.

The combustion system 1 comprises a plurality of combustion chambers, in the embodiment described here ten combustion chambers 100, numbered 1001 to 10010 in the figure, distributed annularly about an axis XX' defining an axial direction DA. Each combustion chamber 100 is delimited by an enclosure 101, here of substantially parallelepiped shape, a closed rear bottom 101b secured to the enclosure 101 and a cylindrical ring 110 on the outer face 112 of which the enclosure 101 is fixed for example by welding, brazing, mechanical (screw-nut) connection or bonding when the enclosures 101 and the cylindrical ring 110 are made of metal material. The cylindrical ring 110 and the enclosures 101 can also be made of ceramic matrix composite (CMC) material that is to say a material formed from a carbon or ceramic fiber reinforcement densified by an at least partially ceramic matrix.

The cylindrical ring 110 forms the front bottom 101a of each combustion chamber which is located closest to the axis XX' in a direction opposite to the rear bottom 101b along a radial direction $D_R$. The cylindrical ring 110 includes a first series of apertures 113 each forming an inlet orifice or intake port 102 of a combustion chamber 100 and a second series of apertures 114 each forming an outlet orifice or exhaust port 103 of a combustion chamber 100 (FIG. 2B). The front bottom 101a of each combustion chamber 100 thus includes an inlet orifice 102 and an outlet orifice 103. The inner face 111 of the cylindrical ring 110, which includes the inlet and outlet orifices of each combustion chamber, is intended to be placed facing a shroud of a selective shut-off element described below in detail. The enclosures 101 of the combustion chambers extend from the outer face 112 of the ring 110 in the radial direction $D_R$.

Figure 3:
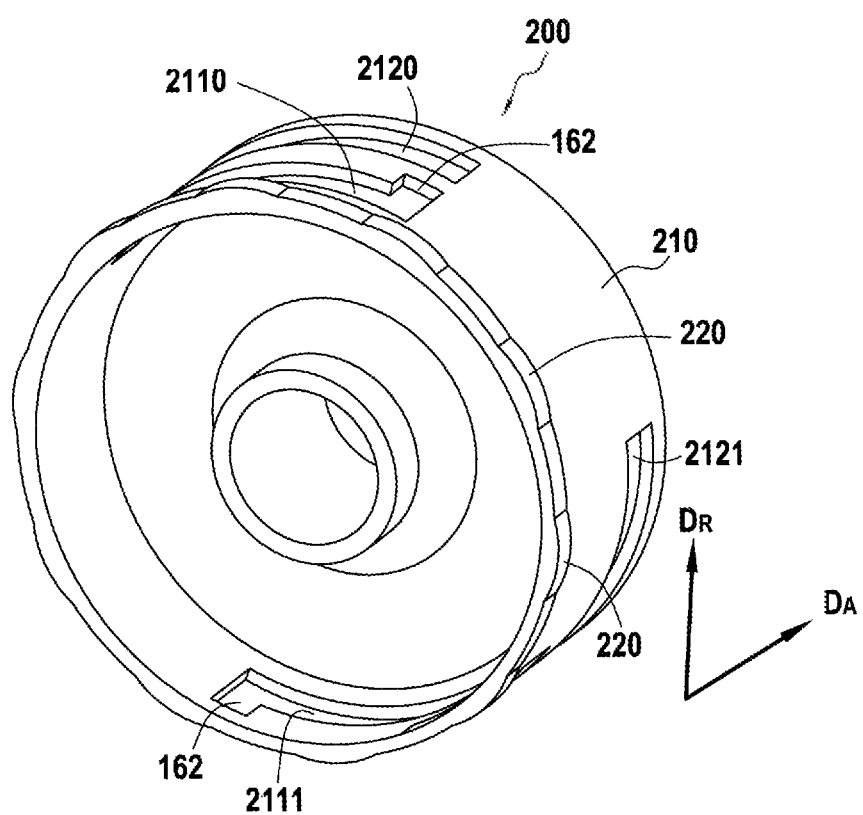
FIG. 3 is a schematic perspective view of the shut-off element of the combustion system of FIG. 1.

The combustion system 1 also comprises a selective shut-off element 200 movable in rotation about the axis XX' relative to the combustion chambers 100. The selective shut-off element 200 comprises a shroud 210 facing the inlet and outlet orifices 102 and 103 of the combustion chambers 100. The shroud 210 is divided into a first annular portion 211 and a second annular portion 212 each extending over the entire circumference of the shroud 210 (FIGS. 2A and 3). The first annular portion 211 includes at least one intake aperture intended to cooperate with the inlet orifice 102 of each combustion chamber 100 during the rotation of the selective shut-off element 200. In the example described here, the first annular portion 211 includes two intake apertures 2110 and 2111 angularly offset by 180° along the first portion. The second annular portion 212 includes at least one exhaust aperture intended to cooperate with the exhaust port 103 of each combustion chamber 100 during the rotation of the selective shut-off element 200. In the example described here, the second annular portion 212 includes two exhaust apertures 2120 and 2121 angularly offset by 180° along the second portion. The beginning of each intake aperture 2110, 2111 is substantially angularly aligned respectively with the beginning of each exhaust aperture 2120 and 2121, the exhaust apertures extending over a circumferential length greater than the intake apertures. The selective shut-off element can be made of metal material or CMC composite material.

The combustion system 1 further comprises a fixed intake guide 300 present inside the shroud 210 of the shut-off element 200 on the side of the first portion 211 of the shut-off element and a fixed exhaust manifold 400 which extends annularly inside the shroud 210 of the selective shut-off element on the side of and along the second portion 212 of said shroud (FIG. 1).

The selective shut-off element 200 is the only movable element rotating in the combustion system 1. In the example described here, it is driven in rotation by means of a drive shaft 233 (FIG. 1). During its rotation, the shut-off element 200 will selectively open and close the inlet and outlet orifices 102 and 103 of each combustion chamber in order to implement constant volume combustion according to the Humphrey cycle, that is to say including a combustion time, an exhaust time, a fresh air intake time and a flue gas scavenging time.

Figure 4:
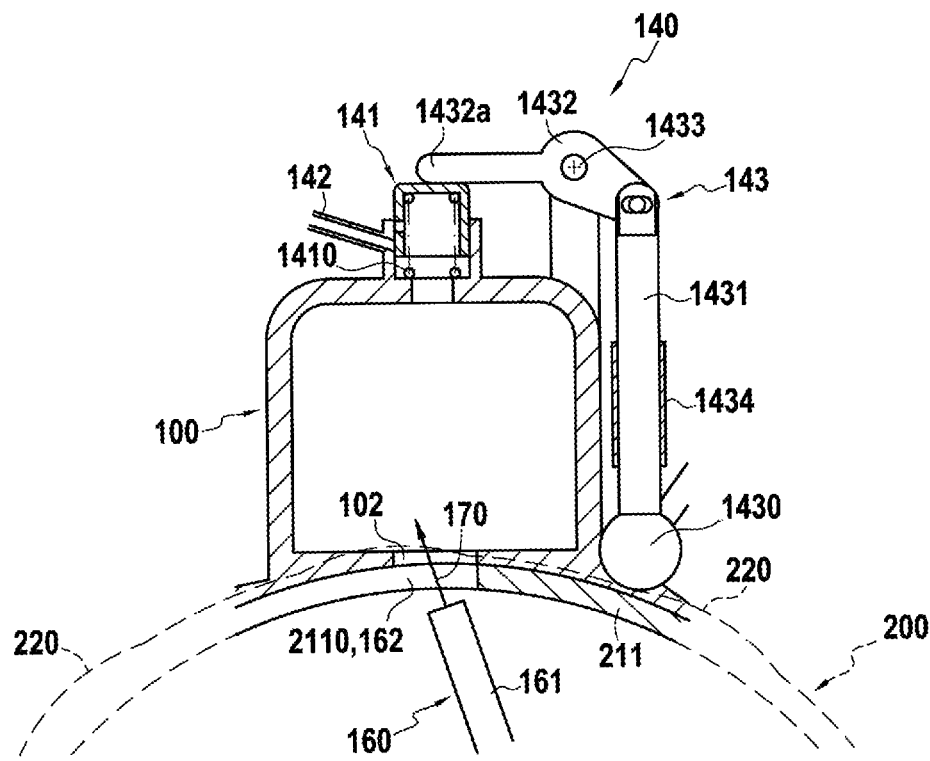
FIG. 4 is a partial radial sectional view of the combustion system of FIG. 1 showing an aerodynamic injection in a combustion chamber.
Figure 5:
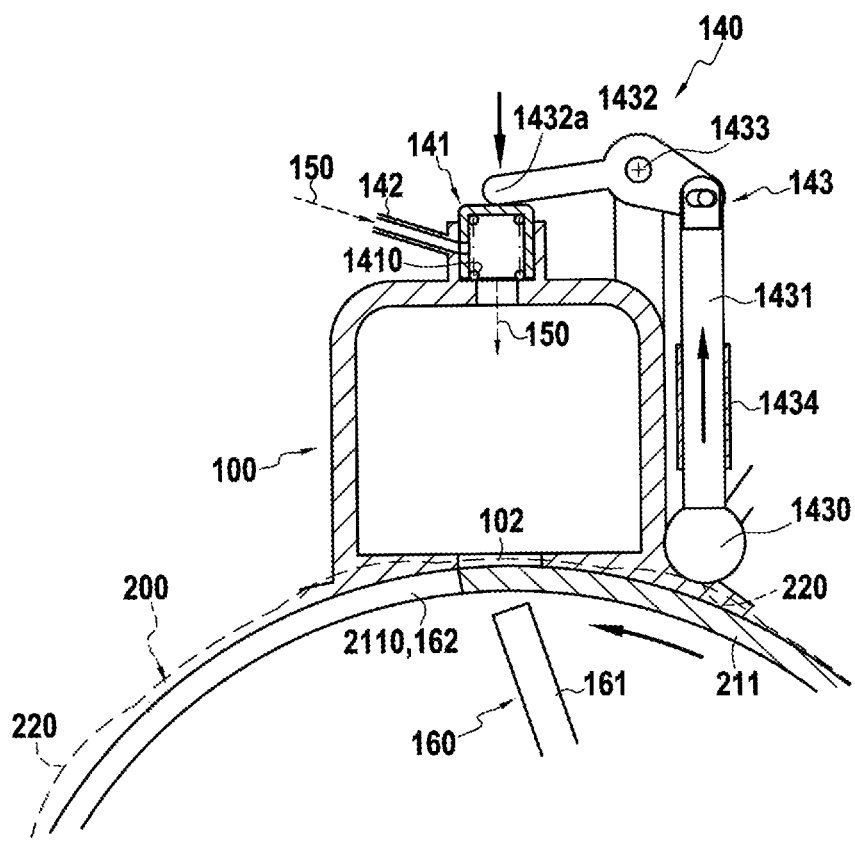
FIG. 5 is another partial radial sectional view of the combustion system of FIG. 1 showing a direct injection into a combustion chamber.

In accordance with the invention, each combustion chamber 100 comprises a fuel injection device 140 whose opening and closing are synchronized by the shut-off element 200. In the example described here, each fuel injection device 140 comprises an injection valve 141 present between a fuel supply circuit 142 and a combustion chamber 100 (FIGS. 4 and 5). Each fuel injection device 140 also comprises a rocker arm 143 configured to control the opening of the injection valve 141. More specifically, the rocker arm 143 comprises a tappet 1430 intended to cooperate with injection cams as explained below, a rocker arm rod 1431 extending the tappet 143 and a finger 1432 pivotally mounted about an axis 1433 and connected at one of its ends to the rocker arm rod 1431. The free end 1432a of the finger 1432 is in contact with the injection valve 141.

The shut-off element 200 includes a plurality of injection cams 220 present here on the end of the first annular portion 211. The injection cams 220 are distributed over the outer surface of the shroud 210 of the shut-off element 200 at determined locations in order to control the injection of fuel into each combustion chamber 100 at moments synchronized with the Humphrey cycle implemented with the shut-off element 200. In other words, the injection cams 220 are placed at angular positions on the shroud 210 of the shut-off element so as to trigger the injection of fuel into a combustion chamber just before the initiation of a combustion phase therein.

The production presented here of the shut-off systems (inlet/outlet orifices) by radial apertures positioned on a cylindrical ring can also be obtained by disks pierced with axial apertures. The two disks (inlet and outlet) are then mechanically linked, one of them comprising the piloting system (cam) of the fuel injection rocker arm.

The operation of a fuel injection device 140 is illustrated in FIGS. 4 and 5. FIG. 4 shows the device 140 in the rest position, that is to say when the tappet 1430 of the rocker arm 143 is not in contact with an injection cam 220. In this position, the free end 1432a of the finger 1432 does not exert pressure on the injection valve 141 which is held in its closed position by a return spring 1410. The rocker arm rod 1431 is housed in a guide sleeve 1434 also provided with a return spring (not represented in FIGS. 4 and 5) in order to hold the rocker arm in the rest position.

In FIG. 5, the shut-off element has moved to an angular position in which an injection cam 220 comes into contact with the tappet 1430 of the rocker arm. In this position, the injection cam 220 pushes on the rocker arm rod 1431 which, by moving along the direction D1, causes the tilting of the finger 1432 and the application of a pressure force of its free end 1432a on the injection valve 141. The injection valve 141 is then open and fuel 150 derived from the fuel supply circuit 142 can then be injected into the combustion chamber 100.

The combustion can be initiated in a known manner either by a spark igniter (plug) or by a thermal gas igniter (not represented in FIGS. 4 and 5). If the conditions allow it, the combustion can also be initiated by Exhaust Gas Recirculation, or EGR, as in a diesel engine.

The system of the invention is here remarkable in that the same part, namely the rotary shut-off element, is used to control both the air openings and closings of the combustion chambers and the fuel injection therein. This ensures optimized management of the times or phases necessary for the implementation of the Humphrey cycle. In addition, the shut-off element allows pressurization of fuel in the combustion chamber without having to use an external high-pressure pump.

According to an additional characteristic of the invention, the constant volume combustion system of the invention further comprises an aerodynamic injection device configured to supply fuel to each combustion chamber in a synchronized manner via one or several injection orifices present on the shut-off element. More specifically, as illustrated in FIGS. 4 and 5, an aerodynamic injection device 160 comprises an aerodynamic pre-carburation injection circuit 161 intended to cooperate with one or several injection orifices 162 present on the shut-off element. In the example described here, the shut-off element 200 includes two injection orifices 162 present on the first annular portion 211 of the shroud 210 at angular positions allowing fuel to be injected into a combustion chamber just before the initiation of a combustion phase therein (FIG. 3). As illustrated in particular in FIG. 3, the injection orifices 162 correspond to openings which cooperate with the intake apertures 2110 and 2111 and which are here offset therefrom along the axial direction DA. This defines an aerodynamic low-pressure injection area that combines the fuel injection with the air intake. In this way, both fuel and air are injected into the combustion chamber. The speed of the injected air at low pressure allows atomizing the injected fuel.

FIG. 4 illustrates an angular position of the shut-off element in which the outlet of the aerodynamic pre-carburation injection circuit 161 is aligned with an injection orifice 162 common with the intake aperture 2110 which is itself aligned with the inlet orifice 102 of the combustion chamber.

In this position, the circuit 161 is controlled to deliver an aerodynamic fuel jet 170 into the combustion chamber 100 via the injection orifice 162. The aerodynamic injection consists in injecting an air/fuel mixture into the combustion chamber. The speed of the air admitted into the combustion chamber allows atomizing the injected fuel.

In FIG. 5, the shut-off element has moved into an angular position in which the outlet of the aerodynamic pre-carburation injection circuit 161 is no longer aligned with an injection orifice 162. This position corresponds to at the moment when fuel 150 is injected into the combustion chamber 100 by the fuel injection device 140 as described above.

In the example described above, the injection device uses a rocker arm and an injection valve for the direct fuel injection. However, other injection devices such as an electric injector with a solenoid valve, for example, can be used. In this case, the shut-off element comprises means for controlling the activation of the solenoid valve according to its angular position. In general, any injection device able to be synchronized with the shut-off element can be used.

In the system presented here, it is entirely conceivable to provide the shut-off element with several cam tracks making it possible to choose a determined fuel distribution sequence according to the operating needs, on the same principle as the variable valve timing system of a piston engine. In this case, the rocker arm will "read" either of the tracks of the cam system defining the injection sequence.

The invention claimed is:

1. A constant volume combustion system for a turbomachine comprising a plurality of combustion chambers distributed annularly about an axis, each combustion chamber comprising an enclosure, wherein the enclosure is parallelepiped shape, and wherein the enclosure includes a first surface with an inlet orifice and an outlet orifice and the enclosure includes a second surface opposite the first surface and the second surface includes a cavity at the center of the second surface, a selective shut-off element movable in rotation about the axis relative to the combustion chambers, the selective shut-off element comprising a shroud facing the inlet and outlet orifices of the combustion chambers, the shroud including on a first annular portion at least one intake aperture intended to cooperate with the inlet orifice of each combustion chamber during the rotation of the selective shut-off element and on a second annular portion at least one exhaust aperture intended to cooperate with the outlet orifice of each combustion chamber during the rotation of the selective shut-off element, wherein each combustion chamber comprises a fuel injection device connected to a fuel supply circuit, wherein the fuel injection device includes a protrusion extending radially outward from the center of the second surface of the enclosure and wherein the fuel supply circuit is connected to a surface of the protrusion, each fuel injection device being operated between a closed position in which the fuel injection device prevents fuel injection in a combustion chamber from the fuel supply circuit and an opened position in which the fuel injection device allows fuel injection in a combustion chamber from the fuel supply circuit, the shut-off element controlling the operation of each fuel injection device between the opened position and the closed position, wherein each fuel injection device includes an injection valve, a return spring, and a rocker arm, wherein the injection valve is housed in the protrusion extending from the second surface of the parallelepiped shaped enclosure and is parallelepiped shape, and wherein a portion of the injection valve extends outside of the protrusion, and wherein the injection valve includes a casing including a hole on a surface of the casing of the injection valve, and wherein when the fuel injection device is in the open position, the fuel supply circuit is in communication with the hole on the surface of the casing of the injection valve and fuel is injected through the injection valve and through the opening of the second surface of the enclosure, and wherein an axial length of the opening of the second surface of the enclosure is less than an axial length of the injection valve, wherein the return spring is housed in the protrusion extending from the second surface of the enclosure and is positioned between the injection valve and the opening of the second surface of the enclosure, and wherein the rocker arm includes a finger and a rocker arm rod, wherein the finger includes a free end connected to a radially outermost surface of the injection valve and, wherein the finger is pivotally mounted about an axis and connected to the rocker arm rod, and wherein the constant volume combustion system comprises an aerodynamic injection device configured to supply fuel to each combustion chamber when aligned with at least one intake aperture of the shut-off element, wherein the aerodynamic injection device is in a same radial position when the at least one intake aperture of the shut-off element is aligned with the inlet orifice of at least one combustion chamber and when the at least one intake aperture of the shut-off element is not aligned with the inlet orifice of at least one combustion chamber.

2. The system according to claim 1, wherein the fuel injection device comprises the injection valve present between the fuel supply circuit and each combustion chamber and the rocker arm configured to control the opening of the injection valve, the rocker arm cooperating with one or several injection cams present on the shut-off element to control the opening of the injection valve.

3. A turbomachine comprising an axial-centrifugal compressor and an axial turbine, the turbomachine further comprising the constant volume combustion system according to claim 1, the constant volume combustion system being present between the axial-centrifugal compressor and the axial turbine.

4. An aircraft comprising at least one turbomachine according to claim 3.

5. The system according to claim 1, wherein the rocker arm includes a tappet connected to an end of the rocker arm rod configured to cooperate with injection cams on the shroud of the shut-off element.

6. The system according to claim 5, wherein the rocker arm rod moves in a radial direction configured to tilt the finger when the tappet is in contact with one of the injection cams, wherein the free end of the finger applies a pressure force on the injection valve to position the injection valve in the open position.

* * * * *